United States Patent [19]

Kane

[11] 4,361,978

[45] Dec. 7, 1982

[54] FISHING BOBBER

[76] Inventor: Hugh Kane, 4950 Lander Rd., Chagrin, Ohio 44022

[21] Appl. No.: 215,820

[22] Filed: Dec. 12, 1980

[51] Int. Cl.³ .............................................. A01K 91/00
[52] U.S. Cl. .................................. 43/44.87; 43/44.91
[58] Field of Search .................. 43/44.91, 44.93, 44.87

[56] References Cited

U.S. PATENT DOCUMENTS

| 327,100 | 9/1885 | Palm | 43/44.91 |
|---|---|---|---|
| 755,683 | 3/1904 | Miller | 43/44.91 |
| 1,122,359 | 12/1914 | Bissett | 43/44.91 |
| 1,504,884 | 8/1924 | Garst | 43/44.91 |
| 2,351,558 | 6/1944 | Sykora | 43/44.87 |
| 2,778,147 | 1/1957 | Peck | 43/44.87 |
| 3,019,546 | 2/1962 | Hansen | 43/44.91 |
| 3,091,050 | 5/1963 | Metzler | 43/44.91 |

FOREIGN PATENT DOCUMENTS 256404  2/1949  Switzerland ...................... 43/44.91

Primary Examiner—Stephen G. Kunin
Assistant Examiner—J. T. Zatarga
Attorney, Agent, or Firm—Witherspoon & Hargest

[57] ABSTRACT

A fishing bobber which may be readily and adjustably secured to a fishing line, said bobber comprising a buoyant body having a top and a bottom, a bearing extending from the top and the bottom of the body, each bearing having a vertical slot therein, a resilient member positioned in a cavity in the bearing intersecting the bearing vertical slot, a keeper rotatably carried on each bearing, the keeper and body each having a slot for alignment with that in the bearings, and a spring lock on each keeper whereby upon insertion of a line in the aligned slots, rotation of each keeper will cause the spring lock to force the line into engagement with the resilient member in each bearing to retain the line and the bobber in fixed relative position.

4 Claims, 4 Drawing Figures

FISHING BOBBER

BACKGROUND AND OBJECTS OF THE INVENTION

The present invention relates generally to buoyant devices used to support a fishing rig a prescribed depth below the water's surface and more particularly to a bobber which may be readily and easily assembled on a fishing line without damage or wear to the fishing line.

Many types of fishing dictate that the fishing rig must be maintained at a specific depth from the water's surface or a prescribed distance from the bottom. In either instance a buoyant device, many times called a bobber, is used to accomplish this. There are a number of bobbers presently in use which have rather strong spring means for biasing a keeper to retain the bobber in position on the line. Such forces may at times abrade the fishing line so that it is not up to designated strength. Most fishermen prefer to use light weight line as it is much easier to work with than the heavy duty type. Unfortunately, when light weight line is used there is no latitude for the line being weaker than the designated weight. Consequently, when the line becomes weakened due to abrasion caused by the line retaining means employed on a bobber, the line may part when a fish strikes. Such is a most disturbing event.

In view of the foregoing it is an object of this invention to provide a buoyant device which will maintain a fishing rig at the described depth and will not damage the fishing line to which it is attached.

It is another object of this invention to provide a bobber for a fishing line which is easily secured to the line without damaging same.

It is yet another object of this invention to provide a bobber which is attached to the fishing line by means of a keeper which brings the line into frictional engagement with a resilient gripping member.

The above and additional objects and advantages will become more apparent when taken in conjunction with the following detailed description and drawings.

IN THE DRAWINGS

FIG. 1 is a front elevational view showing the fishing line initially positioned on the bobber in the aligned slots, FIG. 2 is a top plan view of the bobber as shown in FIG. 1, FIG. 3 is a top plan view similar to FIG. 2 and with the keeper rotated 90° counter clockwise and the fishing line secured in position, and FIG. 4 is a front elevational view showing the bobber body, diametrically extending top and bottom bearings and the resilient members positioned in the bearings.

DETAILED DESCRIPTION

Figure 1:
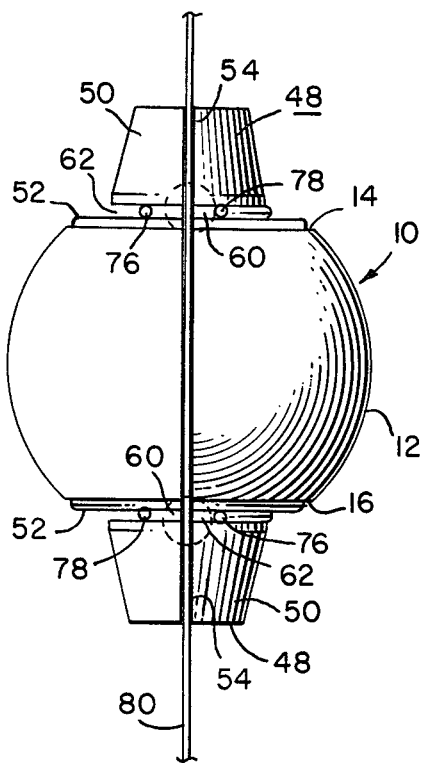

Referring to the various figures of the drawing, the bobber 10 comprises a buoyant body 12 of generally spherical shape having diametrically opposed flattened and parallel portions designated body top 14 and body bottom 16. The body 12 is provided with a vertical slot 18 which extends from the outer surface of the body inwardly to the central vertical axis of the spherical body and thereby connects with the body top 14 and body bottom 16. A rod-like bearing 20 extends perpendicularly outward from the body top 14 with the central axis of the bearing 20 being coaxial with the central vertical axis of the spherical body 12. Bearing 20 is provided with a vertical slot 24 which is aligned with slot 18 in the body 12 and extends inwardly to the vertical axis of the bearing. A second slot 26 is cut in the bearing 20, generally parallel to the body top 14 and spaced therefrom. The bearing 20 is also provided with an opening 30 which extends from the surface of the bearing 20 where the horizontal slot 26 and the vertical slot 24 intersect each other. A resilient member 32 of die rubber or the like is fitted within opening 30.

Bearing 36 is exactly like bearing 20 and is positioned on the body bottom 16 in the same relative location as bearing 20. More specifically, bearing 36 extends perpendicularly outward from the body bottom 16 with its vertical axis coaxial with that of the body 12. Bearing 36 is provided with a vertical slot 40 which is aligned with slot 18 in the body 12 and extends inwardly to the vertical axis thereof. A second slot 42 is cut in bearing 36 generally parallel to the body bottom 16 and spaced therefrom. The bearing 36 is also provided with an opening 44 which extends inwardly from a point where the horizontal slot 42 and the vertical slot 40 intersect each other. A resilient member 45 of die rubber or the like is fitted within opening 44.

A keeper 48 is rotatably positioned on bearings 20 and 36 and comprises a vertical body 50 with a flat flange-like base 52 extending outwardly from the bottom thereof and adapted to ride on body top 14. The body 50 and base 52 are provided with a vertical slot 54 adapted for alignment with slot 24 in bearing 20 and slot 18 in body 12. A peripheral groove 60 is formed in the keeper body 50 at the place where the body connects with the base 52. It should be noted a portion 62 of the peripheral groove 60 is cut completely through the body and is aligned with slot 26 in bearing 20.

Figure 2:
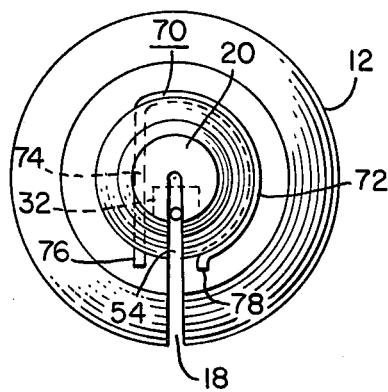

With the aforedescribed bobber components in the position shown in FIGS. 1 and 2, the slot 18 in body 12 is aligned with slot 24 in the bearing 20 and the slot 54 in the keeper 48. The keeper spring 70 is positioned in groove 60 in the keeper body 50. More particularly, keeper spring 70 comprises a circular portion 72 sized to fit in groove 60 in the keeper body 50 and a straight portion 74 fitting into portion 62 of the groove 60 which portion is cut through the body so the straight portion may further fit into slot 26 in the bearing 20. It is by this means that the keeper 48 is retained on its respective bearing. For ease of gripping and assembly the ends 76 and 78 of the keeper spring extend outwardly slightly beyond the keeper body 50. It should be noted that slot 26 is cut so as to limit rotation of the keeper 48 to approximately 90°. The same is true of slot 42.

The aforedescribed keeper 48 and keeper spring 70 are assembled on the lower or bottom bearing 36 in the same manner as set forth for the upper or top bearing 20. It should be noted that resilient members 32 and 45 are positioned in their respective openings so that their exposed faces are generally flush with the adjacent surface of their respective bearings so that the keepers will freely rotate on the bearings.

Figure 3:
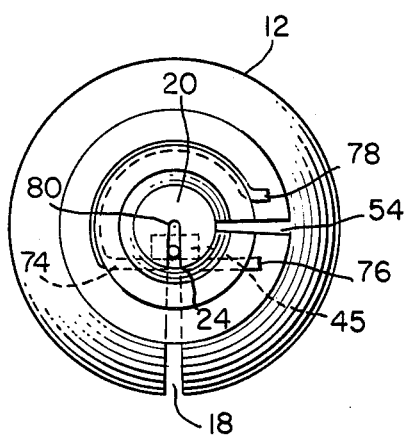
Figure 4:
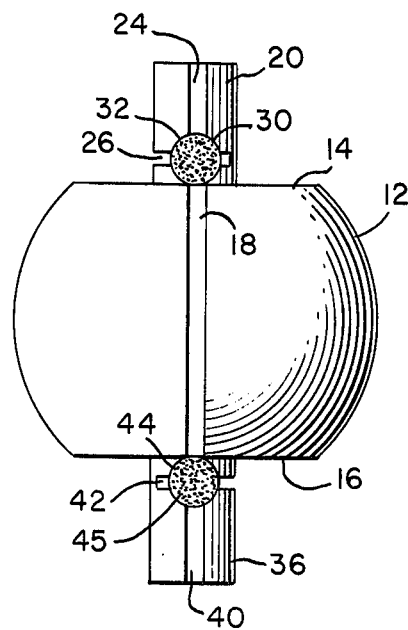

In use, the fishing line 80 is inserted in the aligned slots as indicated in FIGS. 1 and 2 with the line 80 bearing against the resilient members 32 and 45. With the line so positioned, the keeper 48 is rotated counterclockwise to assume the position illustrated in FIG. 3 wherein the straight portion 74 of the keeper spring 70 will press the line 80 into snug frictional engagement with resilient member 32 thereby securing the line 80 to the bobber 10 at this point. Similarly, rotation of the keeper on the lower or bottom bearing 36 will accomplish the same result.

There are many ways in which this bobber could be manufactured, for example the bobber body 12 could be made in two parts and fitted on a through rod having the bearing slots formed on both ends thereof. The keepers are readily molded and slotted for assembly on the bearings. Assembly would be completed by the insertion of the keeper springs in the keepers. The matter of cavities in the central rod to hold the resilient line gripping members is readily accomplished. The choice of materials and specific shapes are a matter of choice very likely dependent upon intended use.

What is claimed is:

1. A fishing bobber which may be readily and adjustably secured to a fishing line without injury to the line, said bobber comprising
   (1) a buoyant body having top and bottom ends with a central vertical axis extending therebetween said body having a slot extending from its outer surface inwardly toward and in alignment with the central vertical axis thereof and connecting the top and bottom ends,
   (2) a bearing extending outwardly from one end of the body,
   (3) line keeper means rotatably carried on the bearing, said line keeper means having a slot alignable with that in the body and line engaging means fixed on the line keeper means for rotation therewith,
   (4) a resilient member carried by the bearing and being positioned thereon in alignment with the body slot and adjacent the line engaging means whereby when the line is positioned in the aligned body and line keeper means slots rotation of the line keeper means will cause the line engaging means to engage and force the line into frictional contact with the resilient member to retain the bobber in fixed position on the line, and
   (5) means on the other end of the body for maintaining the line in the body slot.

2. The invention as set forth in claim 1 and wherein the means on the other end of the body for maintaining the line in the body slot comprises the structure set forth in paragraphs 3 and 4 of claim 1.

3. The invention as set forth in claim 2 and wherein the line engaging means on each line keeper means comprises a lock bar mounted on the line keeper means and rotatable therewith, said lock bar having a portion extending outwardly adjacent the line keeper means slot so as to engage the line and force it onto engagement with the resilient member upon rotation of the line keeper means.

4. The invention as set forth in claim 3 and wherein the lock bar is straight and fits in a groove in the line keeper means.

* * * * *